US008747205B2

(12) United States Patent
Englman

(10) Patent No.: US 8,747,205 B2
(45) Date of Patent: Jun. 10, 2014

(54) GAMING MACHINE WITH BLOCK WAGERING

(75) Inventor: Allon G. Englman, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1119 days.

(21) Appl. No.: 10/077,667

(22) Filed: Feb. 15, 2002

(65) Prior Publication Data

US 2003/0157978 A1 Aug. 21, 2003

(51) Int. Cl.
*A63F 9/24* (2006.01)
*A63F 13/00* (2014.01)
*G07F 17/32* (2006.01)

(52) U.S. Cl.
CPC ............ *G07F 17/32* (2013.01); *G07F 17/3244* (2013.01)
USPC ................... 463/16; 463/26; 463/29; 463/42; 273/138.1; 273/138.2; 273/143 R

(58) Field of Classification Search
USPC ..................... 463/1–9, 12–25, 40–42, 26, 29; 273/48 B, 138.2, 143 R, 292, 138.1–2, 273/148 R
See application file for complete search history.

(56) References Cited

U.S. PATENT DOCUMENTS

| | | | | |
|---|---|---|---|---|
| 2,057,651 | A * | 10/1936 | Mills | 194/291 |
| 2,684,246 | A * | 7/1954 | Soroka | 273/118 A |
| 5,823,873 | A | 10/1998 | Moody | 463/13 |
| 5,851,010 | A * | 12/1998 | Feinberg | 273/274 |
| 5,954,335 | A | 9/1999 | Moody | 273/292 |
| 5,976,016 | A | 11/1999 | Moody et al. | 463/13 |
| 6,007,066 | A | 12/1999 | Moody | 273/292 |
| 6,012,983 | A * | 1/2000 | Walker et al. | 463/20 |
| 6,039,648 | A * | 3/2000 | Guinn et al. | 463/16 |
| 6,077,163 | A * | 6/2000 | Walker et al. | 463/26 |
| 6,098,985 | A | 8/2000 | Moody | 273/292 |
| 6,120,378 | A | 9/2000 | Moody et al. | 463/20 |
| 6,168,523 | B1 * | 1/2001 | Piechowiak et al. | 463/26 |
| 6,224,486 | B1 * | 5/2001 | Walker et al. | 463/42 |

(Continued)

FOREIGN PATENT DOCUMENTS

| | | | | | |
|---|---|---|---|---|---|
| GB | 2242300 | A | * | 9/1991 | G07F 17/34 |
| GB | 2262642 | A | * | 6/1993 | |
| GB | 2353128 | A | * | 2/2001 | G07F 17/34 |
| WO | WO 97/27570 | | | 7/1997 | G07F 17/34 |

OTHER PUBLICATIONS

Advertisement sheet for Batter Up!, WMS Gaming Inc., 1 page, undated.

(Continued)

*Primary Examiner* — William Brewster
*Assistant Examiner* — Ryan Hsu
(74) *Attorney, Agent, or Firm* — Nixon Peabody LLP

(57) ABSTRACT

A gaming machine and a method of conducting a game of chance on the gaming machine are disclosed. The machine receives a wager from a player to purchase a series of plays of the game. In response to the wager, the machine provides the player with the series of plays and randomly generating at least one outcome for each play. The machine provides an accumulation feature that accumulates an element of the game over a plurality of the plays in the series and redeems the accumulated element for a bonus in response to a predetermined event in the game. The predetermined event may, for example, correspond to collection of a predetermined number of the element or a certain position of the element on a trail, feature ladder, or meter.

26 Claims, 14 Drawing Sheets

(56) References Cited

U.S. PATENT DOCUMENTS

| | | | | |
|---|---|---|---|---|
| 6,287,202 | B1 * | 9/2001 | Pascal et al. | 463/42 |
| 6,311,976 | B1 * | 11/2001 | Yoseloff et al. | 273/138.2 |
| 6,311,978 | B1 | 11/2001 | Moody | 273/292 |
| 6,315,291 | B1 | 11/2001 | Moody | 273/139 |
| 6,319,127 | B1 | 11/2001 | Walker et al. | 463/26 |
| 6,364,313 | B1 * | 4/2002 | Moody | 273/138.1 |
| 6,364,765 | B1 * | 4/2002 | Walker et al. | 463/16 |
| 6,406,369 | B1 * | 6/2002 | Baerlocher et al. | 463/20 |
| 6,416,406 | B1 * | 7/2002 | Duhamel | 463/12 |
| 6,533,660 | B2 * | 3/2003 | Seelig et al. | 463/17 |
| 6,537,152 | B2 * | 3/2003 | Seelig et al. | 463/30 |
| 6,648,754 | B2 * | 11/2003 | Baerlocher et al. | 463/17 |
| 6,857,958 | B2 * | 2/2005 | Osawa | 463/20 |

OTHER PUBLICATIONS

Advertisement sheet for Big Bang Piggy Bankin', WMS Gaming Inc., 1 page, undated.

Advertisement sheet for Boom!, WMS Gaming Inc., 1 page, undated.

Advertisement sheet for Off the Charts, WMS Gaming Inc., 1 page, undated.

Advertisement sheet for Winning Streak, WMS Gaming Inc., 1 page, undated.

Advertisement sheet for XFactor, WMS Gaming Inc., 1 page, undated.

Article, "Boom!", *Strictly Slots*, p. 37, Jan., 1999.

Brochure, Stargames, 8 pages, © 1995-2000.

* cited by examiner

GAMING MACHINE WITH BLOCK WAGERING

FIELD OF THE INVENTION

The present invention relates generally to gaming machines and, more particularly, to a gaming machine that provides a player with a series of plays of a game for a single wager.

BACKGROUND OF THE INVENTION

Gaming machines are operable to play such games of chance as slots, poker, keno, bingo, and blackjack. A major limitation inherent in the design of conventional gaming machines is that a wager generally purchases a single play of a game. The machine generates a random event for the purchased play and provides an award to the player for a winning outcome of the random event. Each play of the game is generally independent of other plays such that a given play is not correlated with prior or succeeding plays. Occasionally, the random event for a purchased play may trigger a bonus game involving lively animations, display illuminations, special effects, and/or player interaction, but the hit frequency for such bonus games is generally so low (e.g., once every 100 plays) that a player's gaming experience is still essentially the same from one play to the next. This low hit frequency is generally dictated by underlying math models used in the game to select game outcomes.

The static nature of the gaming experience can cause boredom among players and deter new players from being attracted to a game. Also, players who wish to experience a bonus game may become frustrated during dry spells in which the bonus game is not triggered. Even if the bonus game is eventually triggered, its duration is limited to the current play and another dry spell is likely to ensue at the conclusion of the bonus game.

In an effort to make the gaming experience more dynamic, some conventional gaming machines have attempted to introduce some interdependence between purchased plays of a game with an accumulation feature that accumulates one or more elements of the game over multiple plays. For example, a prior game entitled "Piggy Bankin" includes three symbol-bearing reels and an accumulation feature in the form of a piggy bank. In response to a wager, the reels are spun and stopped to place symbols on the reels in visual association with a pay line. For each spin resulting in three blanks along the pay line, the piggy bank is incremented by the wager amount. For a spin resulting in a "Break the Bank" symbol on the third reel, the player is awarded the accumulated total in the piggy bank. In another example, a prior game entitled "Boom" includes a plurality of symbol-bearing reels and an accumulation feature in the form of a firecracker register. In response to a wager, the reels are spun and stopped to place symbols on the reels in visual association with multiple pay lines. A firecracker mark is added to the firecracker register for every 25 credits wagered. Each firecracker mark is worth one credit. The player is awarded a firecracker bonus equal to the number of firecracker marks in the firecracker register when either (1) the firecracker register reaches fifty firecracker marks, or (2) a spin results in two "wild match" symbols anywhere on the display.

Although such accumulation-type games are generally entertaining, the gaming machines with the accumulation-type games suffer from a couple shortcomings. First, to redeem any accumulated element, a player must continue to wager and play the game until accomplishing an infrequent predetermined event that triggers the redemption of the accumulated element. If the player must walk away from the gaming machine for some reason, e.g., the player runs out of money, the player may be frustrated by his/her forfeiture of the accumulated element which now remains on the machine for redemption by a subsequent player. Second, because players may walk away before redeeming the accumulated element, people looking to play a game with an accumulation feature may scout for and hover around those machines with a more attractive accumulated element. Casinos may frown upon games with this type of "vulturing" effect because players may be pressured to relinquish their machine just when the accumulation feature appears to be ready to pay off.

Accordingly, a need exists for a gaming machine that overcomes one or more of the aforementioned shortcomings associated with conventional gaming machines.

SUMMARY OF THE INVENTION

These and other objects are realized by a gaming machine and a method of conducting a game of chance on the gaming machine are disclosed. The machine receives a wager from a player to purchase a series of plays of the game. In response to the wager, the machine provides the player with the series of plays and randomly generating at least one outcome for each play. The machine provides an accumulation feature that accumulates an element of the game over a plurality of the plays in the series and redeems the accumulated element for a bonus in response to a predetermined event in the game. The predetermined event may, for example, correspond to collection of a predetermined number of the element or a certain position of the element on a trail, feature ladder, or meter.

BRIEF DESCRIPTION OF THE DRAWINGS

The foregoing and other advantages of the invention will become apparent upon reading the following detailed description and upon reference to the drawings.

Figure 4:
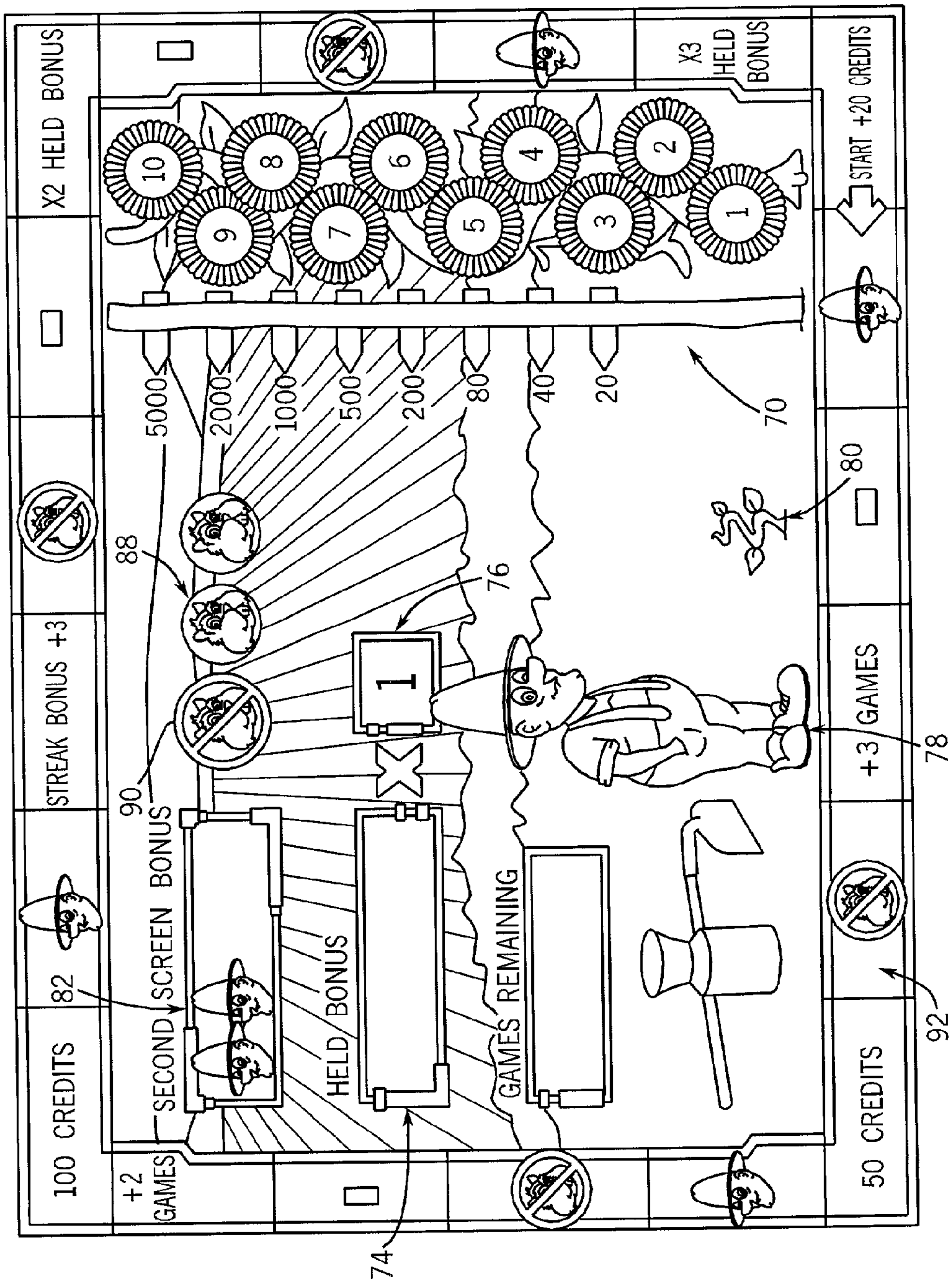
FIG. 4 is a video image on a secondary display primarily associated with various accumulation-type bonus games conducted on the gaming machine.

game triggered by an accumulation of a predetermined number of farmer heads in a farmer head meter in FIG. 4.

Figure 12:
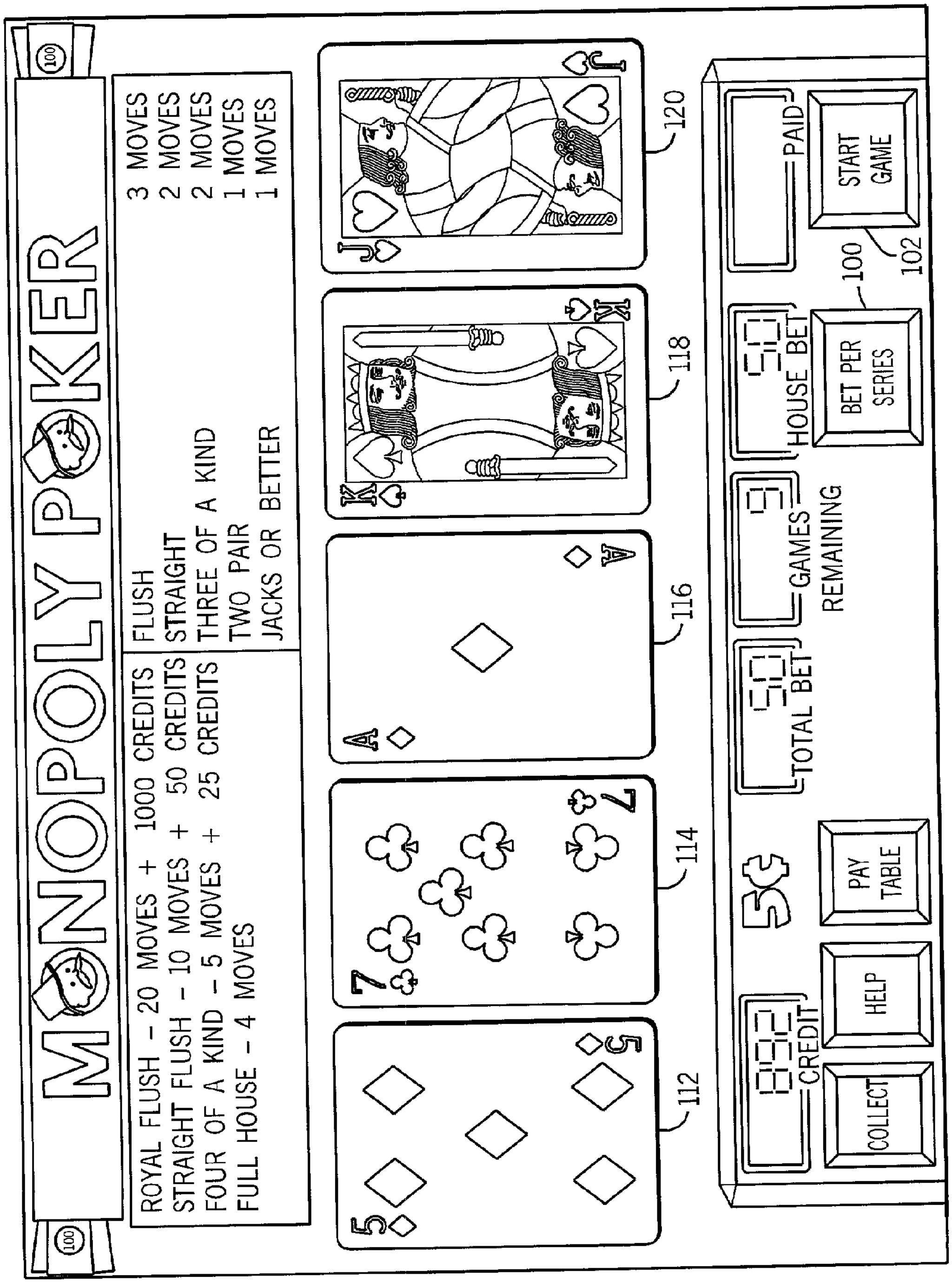

FIG. 12 is a video image on the primary display associated with a poker portion of a Monopoly™ poker game conducted on the gaming machine, in accordance with an alternative embodiment of the present invention.

Figure 13:
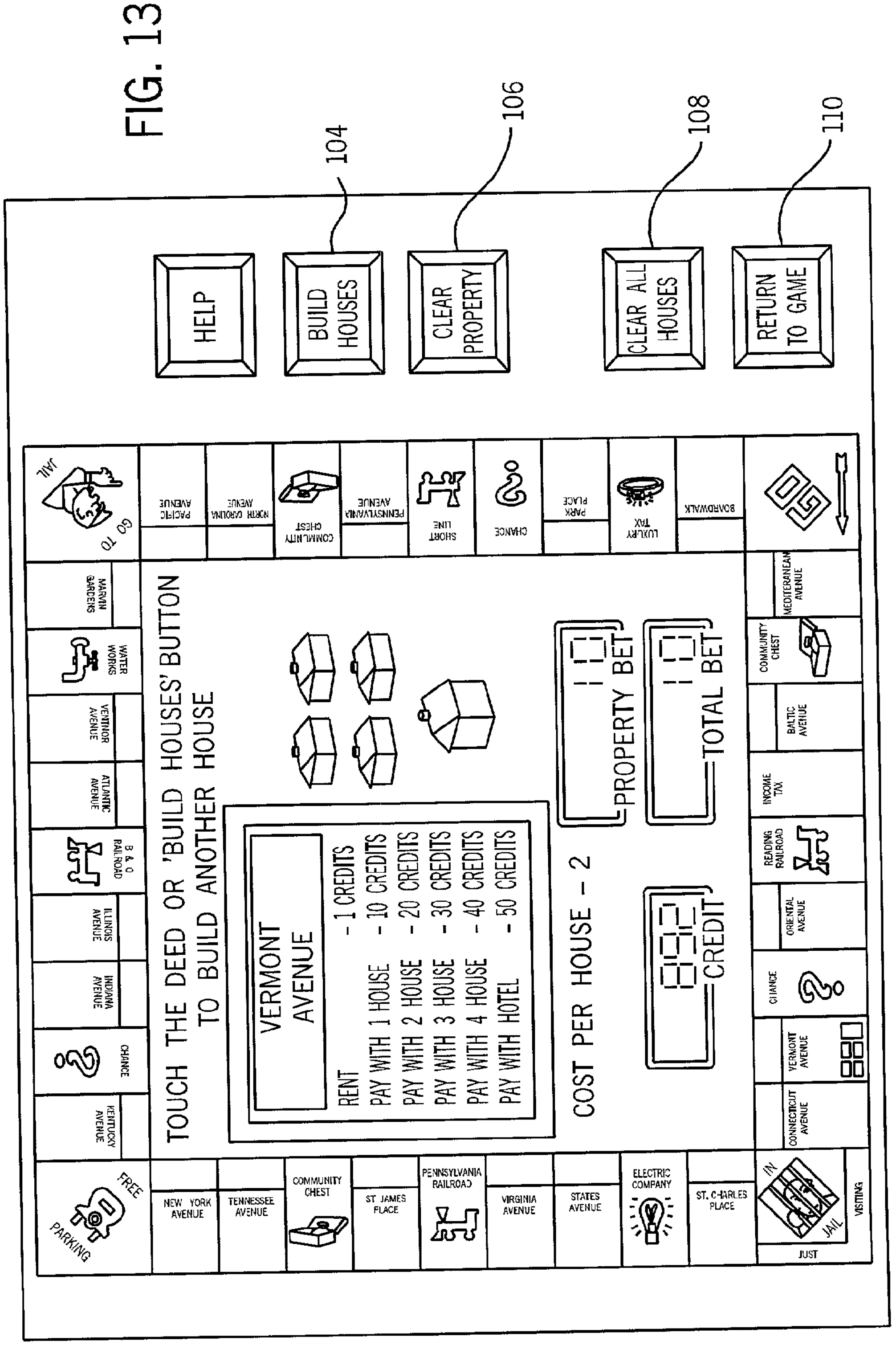

FIG. 13 is a video image on the primary display associated with a house selection portion of the Monopoly poker game.

Figure 14:
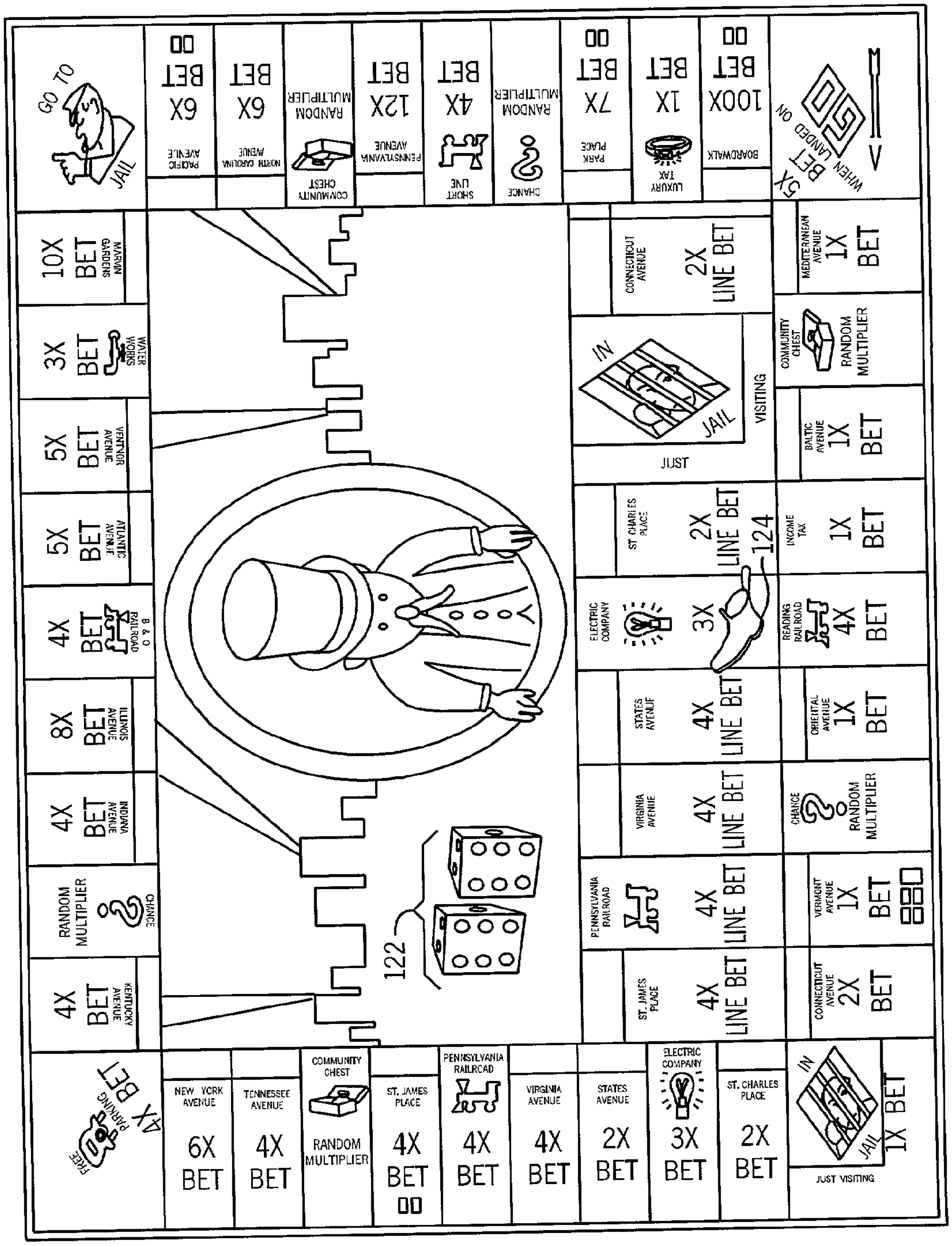

FIG. 14 is a video image on the secondary display associated with an accumulation-type bonus of the Monopoly poker game.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Figure 1:
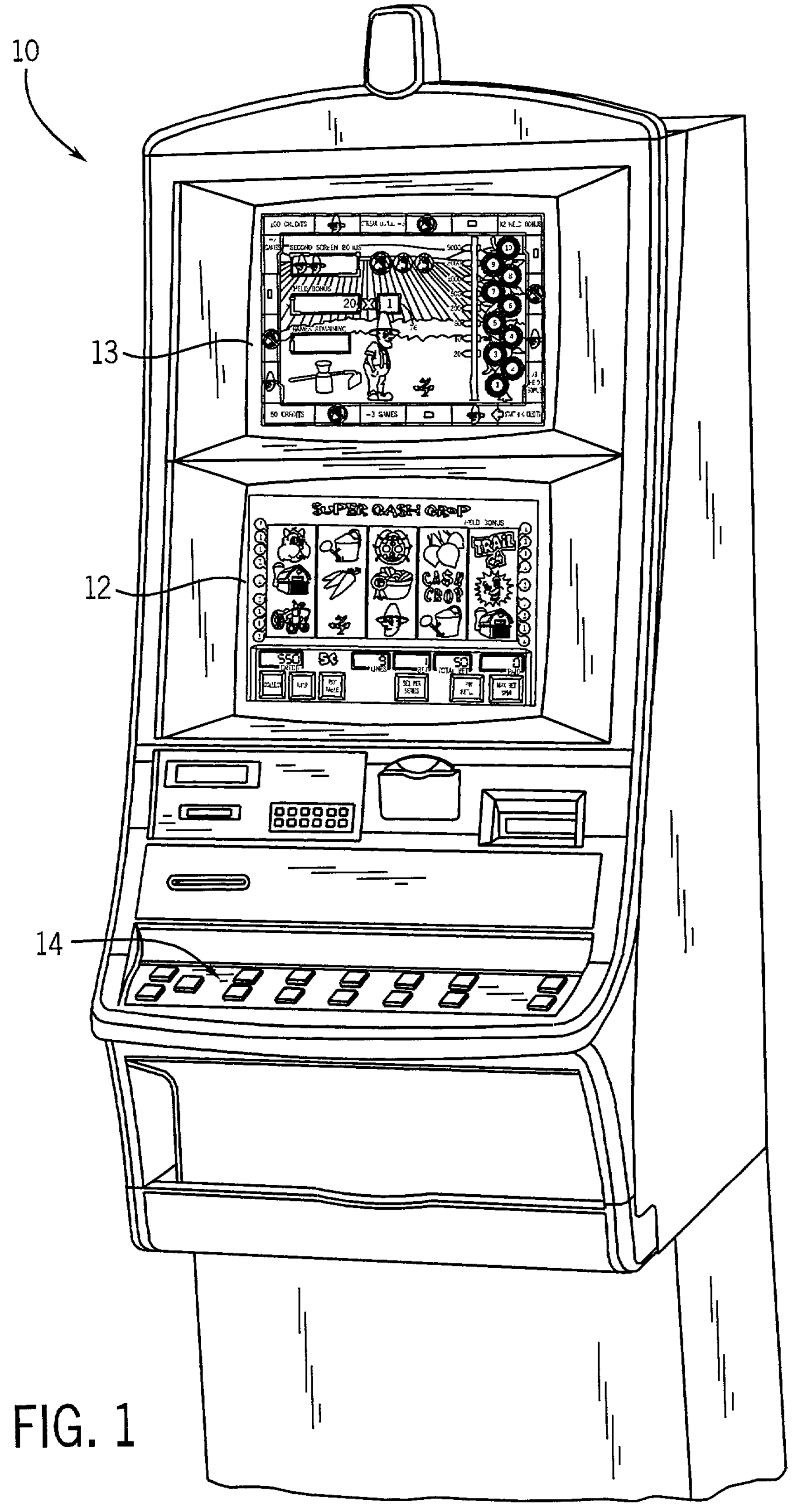
FIG. 1 is an isometric view of a gaming machine embodying the present invention.

Turning now to the drawings, FIG. 1 depicts a gaming machine 10 operable to conduct a game of chance including a basic game and one or more bonus games triggered by respective special outcomes in the basic game. The basic game may, for example, be slots, poker, keno, bingo, blackjack, or roulette. In operation, the gaming machine receives a wager from a player to purchase a series of plays of the game. In direct response to the wager, the gaming machine provides the player with the series of plays of the game. For each "play," the gaming machine generates at least one random event using a random number generator at the beginning of the play and provides an award to the player for a winning outcome of the random event. The gaming machine provides one or more accumulation features each of which accumulates an element of the game over a plurality of the plays in the series and redeems the accumulated element for a bonus in response to a predetermined event in the game.

The gaming machine 10 includes a primary display 12 and an optional secondary display 13 generally above the primary display 12. The primary display 12 is primarily associated with the basic game, while the secondary display 13 is primarily associated with the bonus games. Each display may be a mechanical or video display and, in the case of a video display such as a CRT, LCD, or plasma display, may be outfitted with a touch screen to facilitate interaction with the player. In the illustrated embodiment, the gaming machine 10 is an "upright" version in which the primary display 12 is oriented vertically relative to the player. Alternatively, the gaming machine may be a "slant-top" version in which the primary display 12 is slanted at about a thirty-degree angle toward the player of the gaming machine 10.

Figure 2:
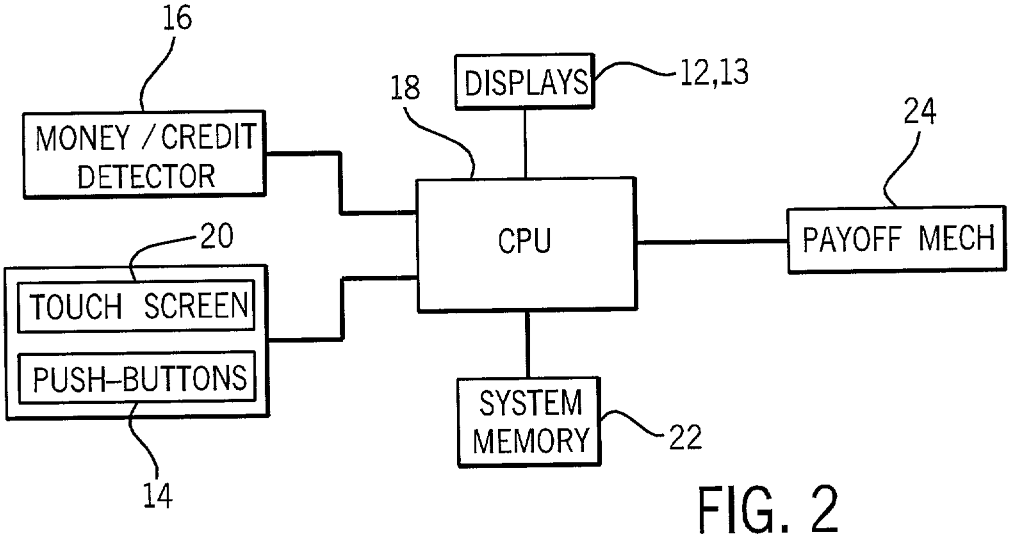
FIG. 2 is a block diagram of a control system suitable for operating the gaming machine.

FIG. 2 is a block diagram of a control system suitable for operating the gaming machine 10. Money/credit detector 16 signals a central processing unit (CPU) 18 when a player has inserted money or played a number of credits. The money may be provided by coins, bills, tickets, coupons, cards, etc. Using a button panel 14 (see FIG. 1) or the touch screen 20, the player may select any variables associated with the game and place his/her wager to purchase a series of plays of the game. In direct response to the wager, the CPU 18 provides the player with the series of plays. For each play, the CPU 18 generates at least one random event using a random number generator (RNG) and provides an award to the player for a winning outcome of the random event. The game is shown on the primary and/or secondary displays 12, 13.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player. The payoff may, for example, be in the form of a number of credits. The number of credits are determined by one or more math tables stored in the system memory 22.

Figure 3:
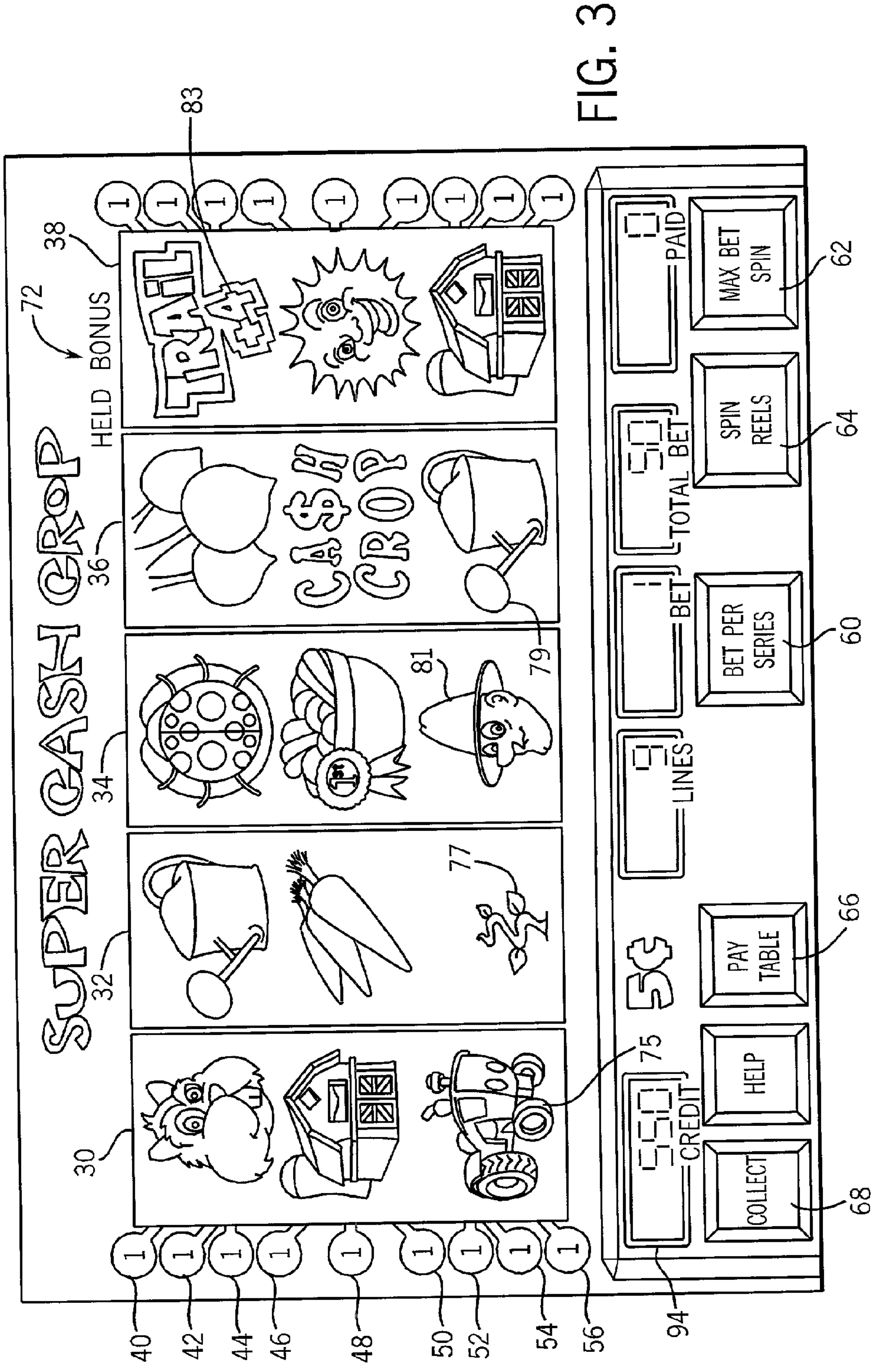
FIG. 3 is a video image on a primary display primarily associated with a basic slot game conducted on the gaming machine.

Referring to FIGS. 3 and 4, there is depicted an example of a video-only, dual-display game that provides a player with a series of plays for a single wager. Because the game is implemented entirely in video, both the primary and secondary displays 12 and 13 in the example are video displays. FIG. 3 is a video image on the primary display 12 primarily associated with a basic slot game conducted on the gaming machine. FIG. 4 is a video image on the secondary display 13 primarily associated with various accumulation-type bonus games conducted on the gaming machine.

In accordance with the present invention, the gaming machine initially receives a wager from a player to purchase a series of plays of the game. The wager may be determined by variables to be selected by the player. Such variables may vary with the type of basic game. The basic game may, for example, be slots, poker, keno, bingo, blackjack, and roulette. If the basic game is a multi-line slot game as shown in FIG. 3, the player may select his or her wager for the series of plays of the game by pressing a "Bet Per Series" key 60 or a "Max Bet Spin" key 62 on the primary display 12. Any onscreen keys may be duplicated on the button panel 14 (see FIG. 1) so that the player may implement a function via either the touch screen or the button panel. The selected number of wagered credits may vary in "N" credit intervals between a minimum number such as 50 credits and a maximum number such as 450 credits, where N is a number such as 50. For example, if the number of plays in a series is ten and the number of active pay lines is nine, a minimum wager of 50 credits per series may yield a wager of one credit per pay line; a wager of 100 credits per series may yield a wager of two credits per pay line; a wager of 150 credits per series may yield a wager of three credits per pay line; and so on. The maximum wager per series may, for example, be 450 credits, which yields a wager of nine credits per pay line. In the illustrated embodiment, the number of plays in a series and the number of active pay lines cannot be changed by the player. The number of plays and the number of active pay lines are set to constant values such as ten and nine, respectively. In an alternative embodiment, the player may be allowed to select such options, which would also affect the total number of credits wagered on the series of plays.

In response to the wager, the machine provides the player with the series of plays of the game. For each play, the machine conducts a basic game and any bonus games triggered by respective special outcomes in the basic game. In the basic game, the machine generates at least one random event and provides an award to the player for a winning outcome of the random event. The random event in the basic game for each play is preferably independent of other plays in the series.

If the basic game is a multi-line slot game as shown in FIG. 3, the slot game includes a plurality of simulated spinning reels 30, 32, 34, 36, and 38. For each play in the purchased series of plays, the reels are spun and stopped to place symbols on the reels in visual association with a number of possible pay lines 40, 42, 44, 46, 48, 50, 52, 54, and 56. Each of the pay lines extends through one symbol on each of the reels. The number of reels and the number of possible pay lines may be varied to be more or less than the number illustrated in FIG. 3.

For each play, the reels 30, 32, 34, 36, and 38 are set in motion by touching a "Spin Reels" key 64 or pulling a traditional handle (not shown) mounted to a cabinet of the gaming machine. The machine uses a random number generator (RNG) to select a basic game outcome corresponding to a particular set of reel "stop positions." The machine then causes each of the reels to stop at the appropriate stop position. Video symbols are displayed on the reels to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In one embodiment, the pay table is affixed to the machine 10 and/or displayed by one of the displays 12, 13 in response to a command by the player (e.g., by pressing a "Pay Table" key 66). A winning basic game outcome occurs when the symbols appearing on the stopped reels along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game credits the player an amount corresponding to the award in the pay table for that combination multiplied by the number of credits wagered on the winning pay line. In one implementation, the winning combinations start from the first reel 30 (left to right) and span adjacent reels. In an alternative implementation, the winning combinations start from either the first reel 30 (left to right) or the fifth reel 38 (right to left) and span adjacent reels.

Included among the plurality of basic game outcomes are special outcomes for triggering respective bonus games. A special outcome may be defined in any number of ways. For example, a special outcome may occur when a special symbol or a special combination of symbols appears on one or more of the reels. The special outcome may require the special symbol or symbol combination to appear along an active pay line, or may alternatively require the special symbol or symbol combination to appear anywhere on the display regardless of whether the symbols are along an active pay line. The appearance of a special outcome causes the machine to shift operation from the basic game to the bonus game associated with that special outcome.

FIG. 4 shows some possible bonus games that may be triggered by respective special outcomes in the basic slot game. Any bonus games triggered by respective special outcomes in the basic slot game for each play may be interdependent of one or more other plays in the series. Specifically, each bonus game may be of an accumulation type and accumulate an element over a plurality of the plays in the series. Examples of accumulation-type bonus games are described below.

"Streak Bonus" Game:

The "Streak Bonus" game employs a winning streak tree or ladder 70 in FIG. 4 and awards the player with a bonus credit amount for achieving winning outcomes over a predetermined number of consecutive plays in the purchased series of plays. For purposes of the "Streak Bonus" game, a play yields a "winning outcome" if any credits are awarded to the player during that play as a result of the basic game or any triggered bonus games. The winning streak ladder 70 includes numbers ranging from 1 to a maximum such as 10. At the beginning of the purchased series of plays, no numbers in the ladder 70 are highlighted. As the machine conducts the purchased series of plays, streaks of consecutive winning outcomes ("winning streaks") are shown by the ladder 70. Each play that yields a winning outcome moves the highlighting up the ladder 70 by one number, but any play that yields a non-winning outcome resets the ladder 70 so that no numbers are highlighted. As described below, the highlighting may also be moved up the ladder 70 by a Winning Streak adder obtained in the "Trail Bonus" game.

Figure 5:
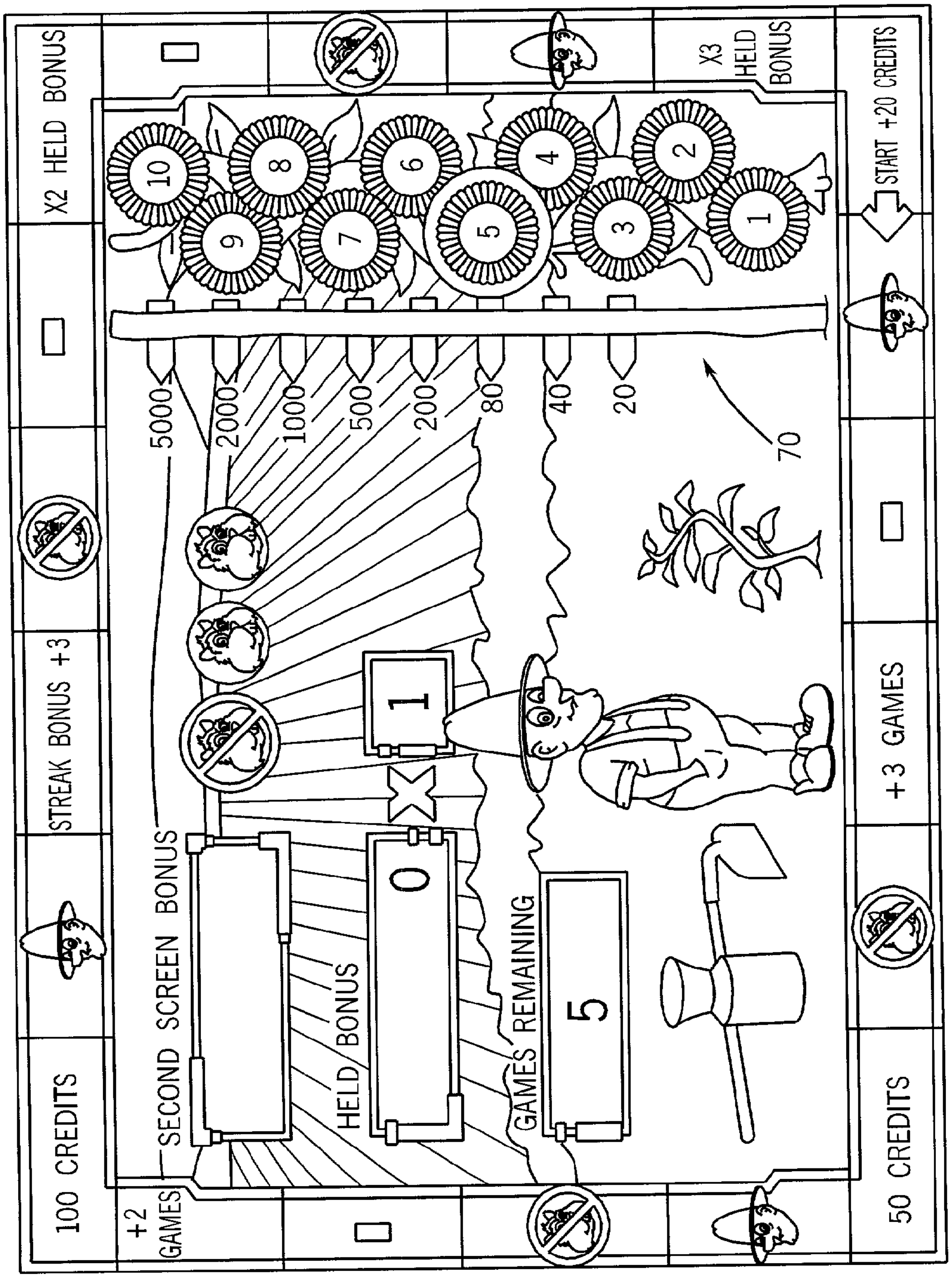
FIG. 5 is a video image on the secondary display showing a winning streak ladder indicating five consecutive wins.

A winning streak must reach a predetermined number of consecutive plays, such as three plays, in order for the player to qualify for a credit amount. In one embodiment, the machine only awards the player with a credit amount at the end of a qualifying winning streak. The awarded credit amount is the credit amount associated with the highest number of consecutive plays in the winning streak. Therefore, if a winning streak ends at five as in FIG. 5, the machine only awards the player with the credit amount (e.g., 80 credits in FIG. 5) associated with five consecutive wins. The credits amounts associated with three and four consecutive wins are not awarded. In another embodiment, the machine awards the player with a credit amount for each qualifying winning streak even if the winning streak continues on the next play. Therefore, if a winning streak ends at five, the machine awards the player with the credit amounts associated with three, four, and five consecutive wins as these respective winning streaks are achieved on the way to five consecutive wins. After the third consecutive win, the credit amount (e.g., 20 credits in FIG. 4) for three straight wins is awarded; after the fourth consecutive win, the credit amount (e.g., 40 credits in FIG. 4) for four straight wins is awarded; and after the fifth consecutive win, the credit amount (e.g., 80 credits in FIG. 4) for five straight wins is awarded.

Figure 6:
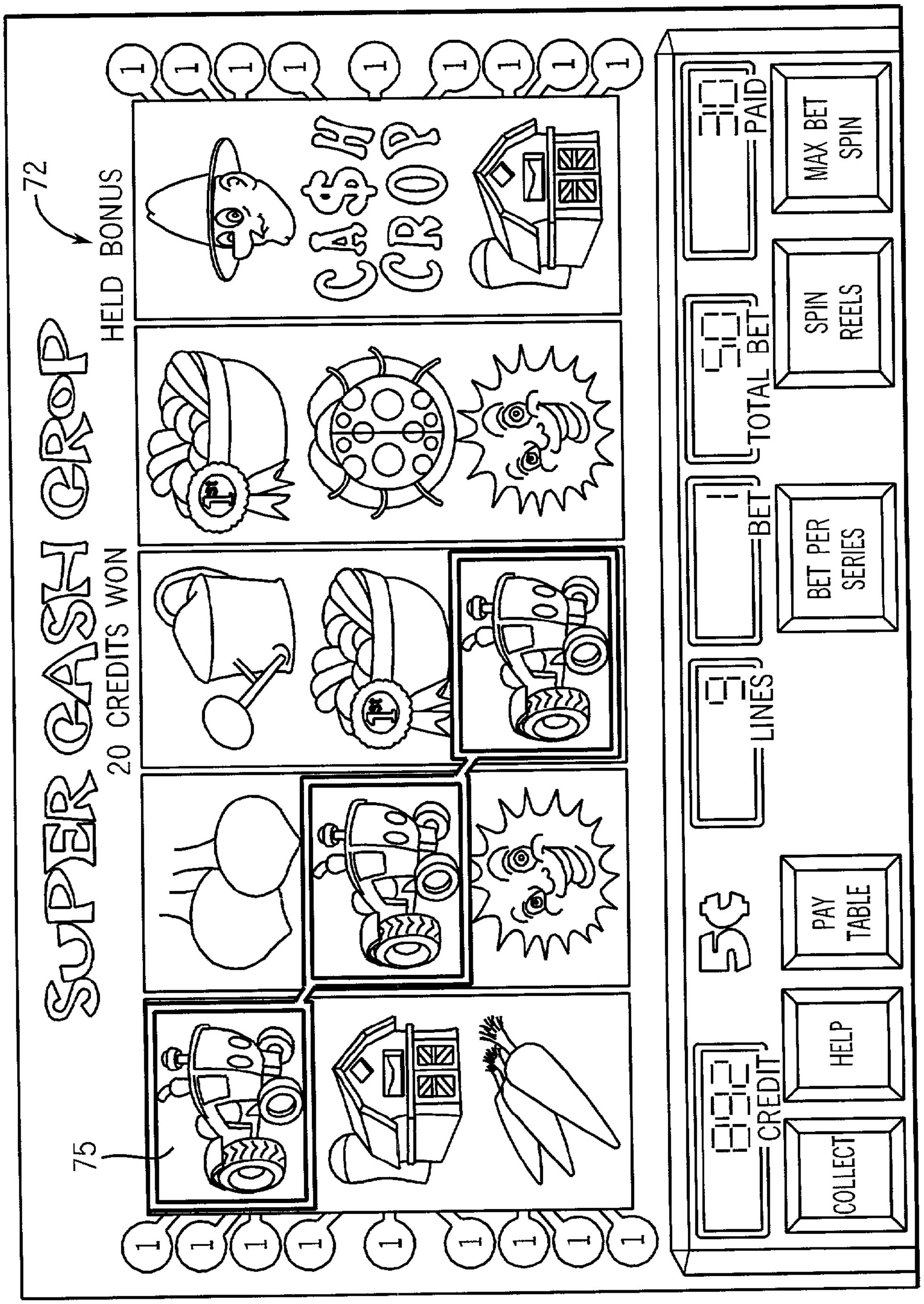
FIG. 6 is a video image on the primary display showing a Held Bonus symbol above the reels when a winning combination of three TRACTOR symbols appears along a pay line.
Figure 7:
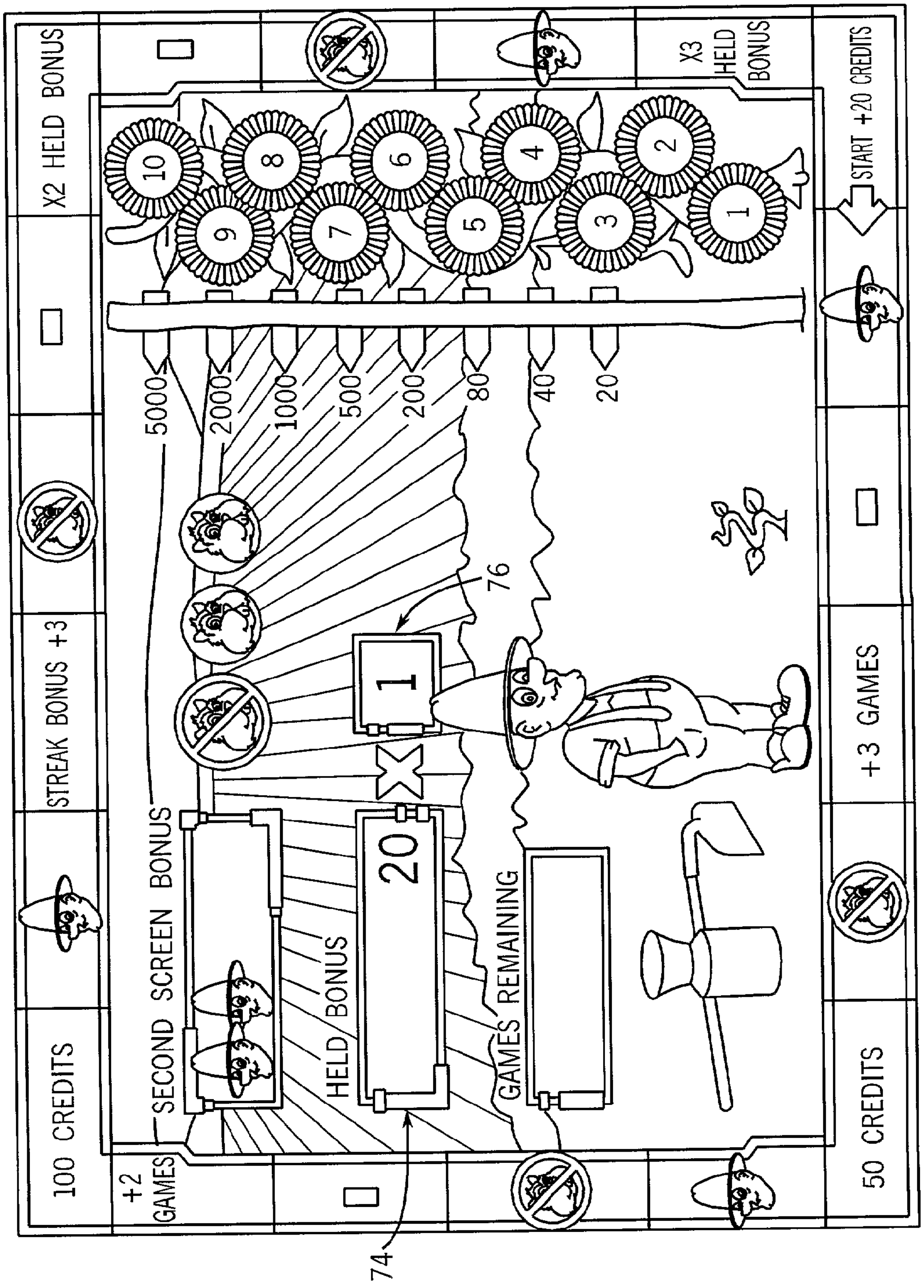
FIG. 7 is a video image on the secondary display showing a credit amount in a Held Bonus meter in response to the winning TRACTOR symbol combination in FIG. 6.

"Hold Bonus" Game:

Prior to any play in the purchased series of plays, a Held Bonus symbol 72 may randomly appear above the reels in FIG. 3 before the reels are spun. Any credits awarded to the player during that play of the basic slot game and any triggered bonus games are also added to a Held Bonus meter 74 in FIG. 4. For example, the 20 credits awarded for a winning combination of three TRACTOR symbols 75 in FIG. 6 are added to the Held Bonus meter 74 in FIG. 7. At the conclusion of the purchased series of plays, the machine awards the player with the number of credits on the Held Bonus meter 74. As described below, the current number of credits on the Held Bonus meter 74 may be multiplied by a Held Bonus multiplier 76 obtained in the "Trail Bonus" game. Also, the appearance of the Held Bonus symbol above the reels in FIG. 3 before the next play may be triggered by a Hold Bonus Next Spin result obtained in the "Trail Bonus" game.

"Symbol Development Bonus" Game:

The "Symbol Development Bonus" game affects at least one evolving symbol appearing on the reels of the basic slot game. The evolving symbol may, for example, be a PLANT symbol 77 that appears somewhat frequently on the reels. After each reel spin that yields a winning combination of three WATERING CAN symbols 79, the machine awards the player with the credit amount associated with that winning combination as identified by the pay table, and then enhances (e.g., doubles) the credit amounts associated with any future winning combination during the purchased series of plays when the evolving symbol is along the same pay line as the winning combination.

Figure 8:
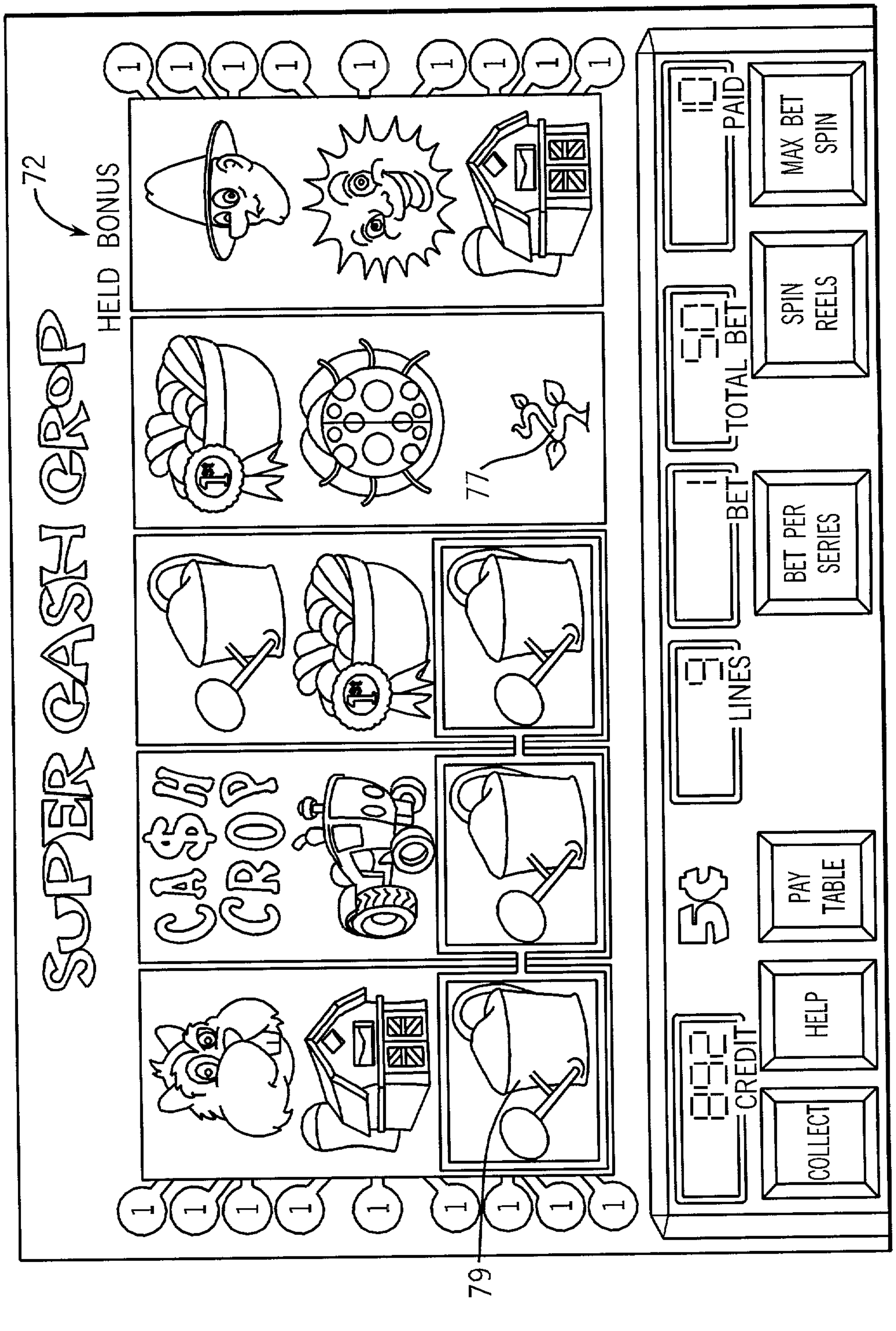
FIG. 8 is a video image on the primary display showing a winning combination of three WATERING CAN symbols along a pay line.
Figure 9:
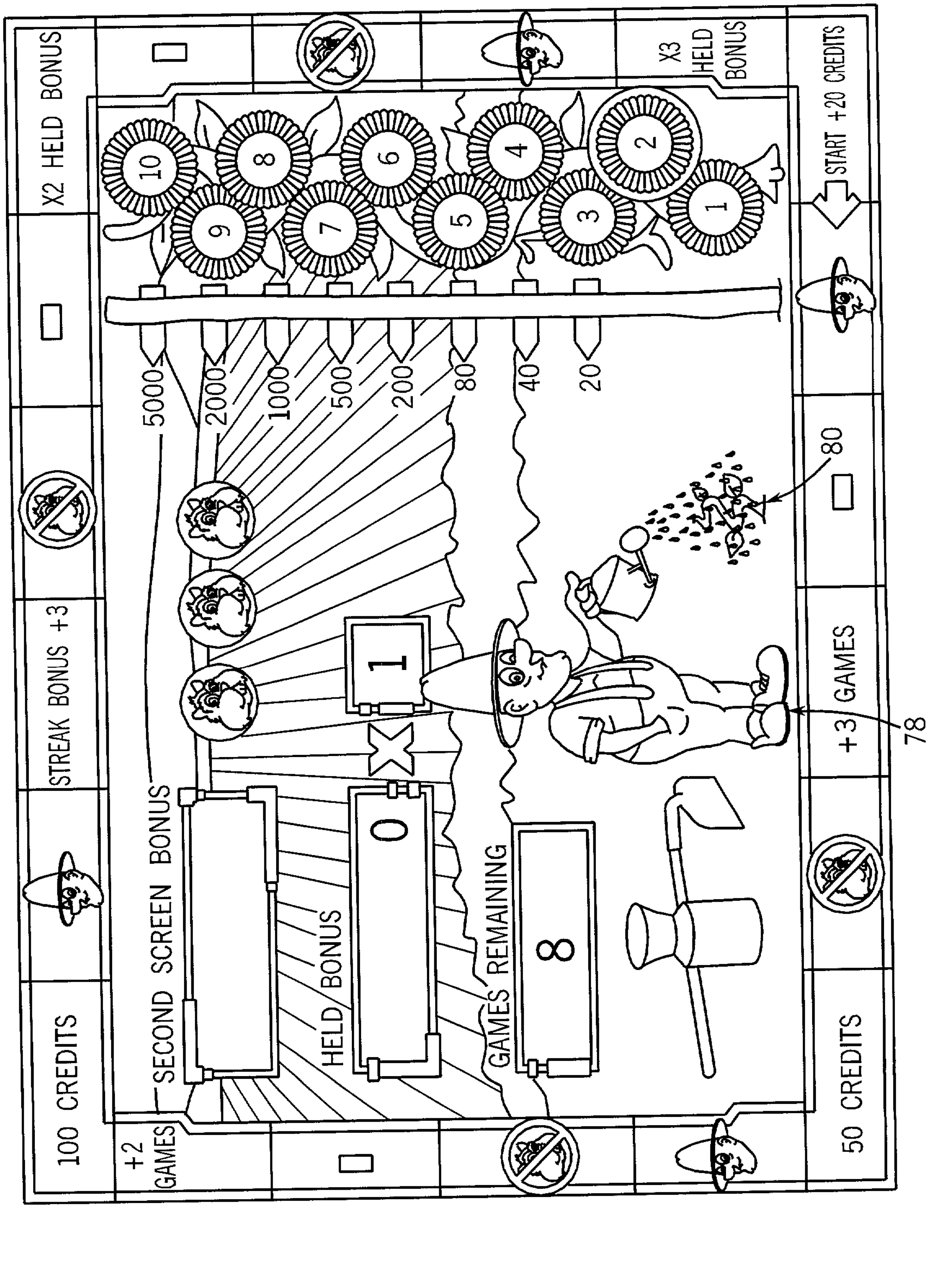
FIG. 9 is a video image on the secondary display showing a farmer watering a plant in response to the winning WATERING CAN symbol combination in FIG. 7.
Figure 10:
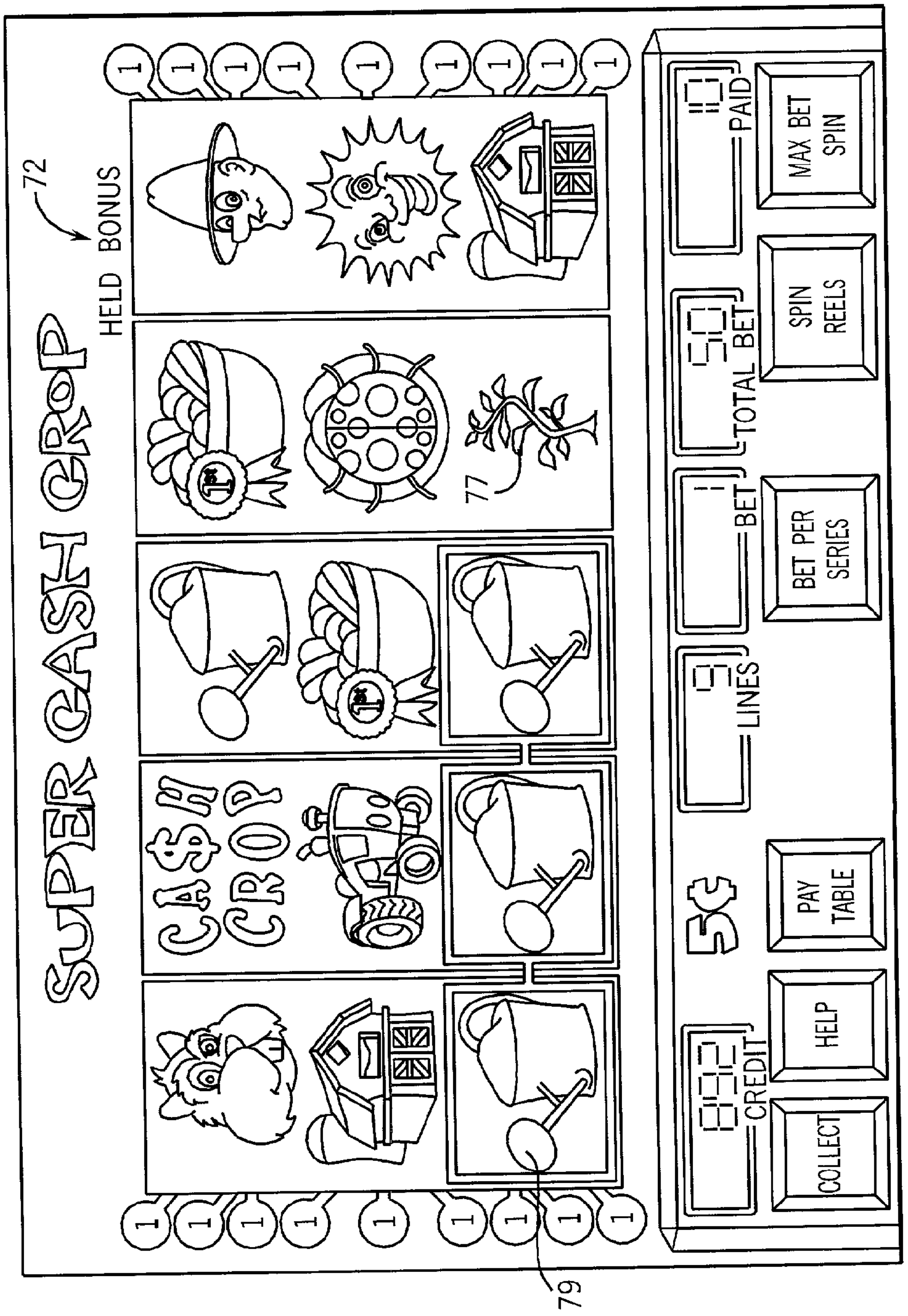
FIG. 10 is a video image on the primary display showing a PLANT symbol growing on the reels in response to the winning WATERING CAN symbol combination in FIG. 7.

To convey to the player that the credit amounts for any future winning combination along the same pay line as the evolving symbol will be enhanced, the machine may also change (e.g., enlarge) the appearance of the evolving symbol on the reels. For example, when a winning combination of three WATERING CAN symbols 79 appears on the reels as in FIG. 8, the farmer 78 in FIG. 9 waters the plant 80. Watering the plant causes the plant 80 to grow and causes the PLANT symbol 77 to grow on the reels. The enlarged PLANT symbol 77 is shown in FIG. 10 and is indicative that any future winning combination along the same pay line as the PLANT symbol will be enhanced (e.g., doubled).

As described below, the evolving symbol may also be enhanced by the "Trail Bonus" game.

"Second Screen Bonus" Game:

The "Second Screen Bonus" game includes an accumulation phase and an award phase. In the accumulation phase, the "Second Screen Bonus" game accumulates farmer heads in a farmer head meter 82 in FIG. 4. In response to a FARMER symbol 81 appearing on the stopped reels, a farmer head is added to the meter 82. When a predetermined number (e.g., five) of farmer heads have been accumulated in the meter 82, the "Second Screen Bonus" game proceeds to the award phase shown in FIG. 11 on the primary display 12 or the secondary display 13.

Figure 11:
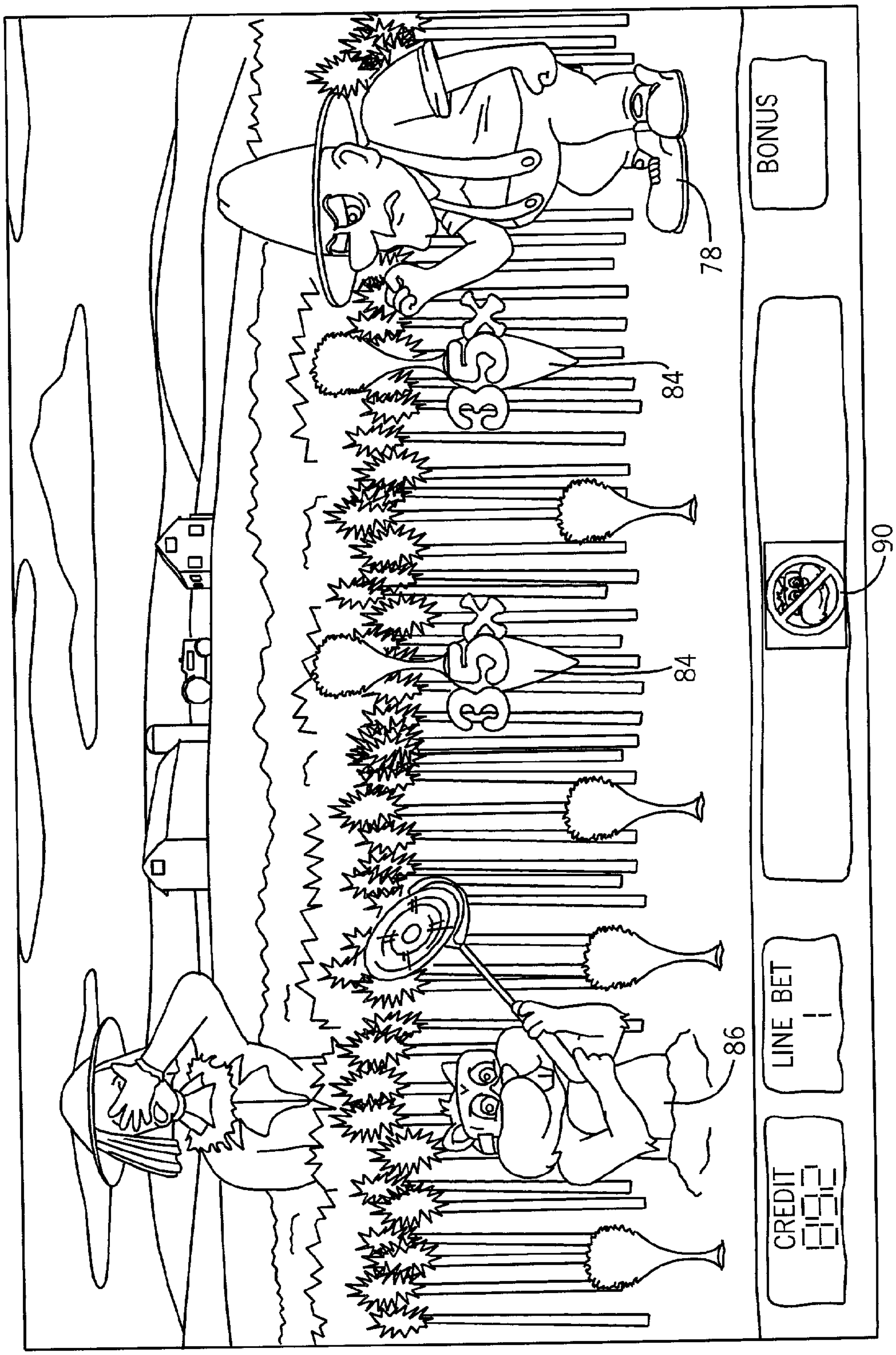
FIG. 11 is a video image on the primary or secondary display showing an award phase of a "Second Screen Bonus"

The award phase includes five crops of root vegetables appearing in order of least to greatest overall value. These five crops are potatoes, turnips, beets, radishes, and carrots. Each crop consists of seven vegetables, lined up in a row, which are not yet pulled from the ground. Underground, there a hidden gopher that may be dining on one or more of these vegetables. The player must help the farmer 78 successfully pick any three uneaten vegetables out of the seven in order to advance on to the next more valuable vegetable crop. In FIG. 11, for example, the player has thus far successfully picked two carrots 84, each worth 35 times the line bet for an accumulated bonus of 70 credits. The player may select a vegetable that the gopher has already eaten and left behind. The player will not win any credits for this selection but may continue picking. If the player picks the vegetable and the gopher 86 appears as in FIG. 11, the award phase ends and the player is awarded the winnings that the player had accumulated before picking the gopher 86.

Each successive round plays the same. The player must continue to try to avoid the gopher 86 and pick three uneaten vegetables. In addition to regular vegetables, special bonus vegetables may be randomly introduced among the row of seven. These may be in the form of a special "silver" vegetable, which is worth 2× the normal value of that vegetable, and a "gold" vegetable, which is worth 3× the normal value of that vegetable. The award phase is complete when the player successfully negotiates his or her way through all five crops without picking a gopher. The player then collects his or her total winnings and returns to basic slot game. In an alternative embodiment, if an already eaten vegetable is picked, no credit value is awarded but the pick counts towards the three necessary to move on to the next crop.

Throughout the award phase, the top portion of the display contains a cloud animation showing the development of various types of weather. As the award phase progresses, additional darker clouds may begin to appear. The increased cloud activity may eventually result in a rain shower. If rain begins to fall, it happens following a transition to the next crop and lasts approximately 3-5 seconds. After the rain stops an animation takes place over all uneaten vegetables. The vegetables in that current crop will appear to grow in size and their value doubles. If the player progresses on to the next crop, the vegetable values return to their normal amount. The timing of the rain is determined, based upon certain probabilities, at the beginning of the award phase. It preferably does not rain in the first round or in consecutive rounds of the award phase, but all other combinations of rain bonuses are possible including, for example, rain during the second and fifth rounds.

At the conclusion of the award phase, the farmer head meter 82 in FIG. 4 may be reset to include no farmer heads and the "Second Screen Bonus" game may return to the accumulation phase for subsequent plays in the purchased series of plays. Alternatively, instead of returning to the accumulation phase, the "Second Screen Bonus" game may proceed to a second award phase tied directly to any FARMER symbols 81 that appear on the stopped reels during any plays (i.e., reel spins) remaining in the purchased series of plays. In the second award phase, if a FARMER symbol appears on an active pay line in any of the remaining plays, the machine awards the player with a credit amount multiplied by the number of credits wagered on that pay line.

As described below, farmer heads may also be added to the meter 82 by a Farmer Head adder obtained in the "Trail Bonus" game.

As an additional feature, the "Second Screen Bonus" game may also employ an anti-gopher "save" feature. Up to three anti-gophers 90 may be obtained in the "Trail Bonus" game and are accumulated next to the farmer head meter 82 on an anti-gopher indicator 88. An anti-gopher 90 is represented by a gopher with a slash through it. If the player selects a vegetable during the award phase and the gopher 86 appears as in FIG. 11, the gopher 86 may be nullified (negated) by any accumulated anti-gophers 90 to continue the award phase when it otherwise would end. When an anti-gopher 90 is used to nullify a gopher 86, the number of accumulated anti-gophers 90 is reduced by one.

"Trail Bonus" Game:

The "Trail Bonus" game employs a trail shown at peripheral region 92 in FIG. 4. The trail may, for example, be a closed loop near the border of the video image on the secondary display 13. The trail includes a plurality of spaces for triggering awards, other bonus games, or free plays of the basic slot game. A space marker, such as a token or highlight, may initially be located at a designated "start" space or at a random space along the trail. In response to a TRAIL symbol 83 appearing on the stopped reels, a random number appears on the symbol. The space marker advances along the trail by a number of spaces corresponding to the random number appearing on the reel symbol. The space on which the marker lands may, for example, trigger the following additional functions:

- "N credits"—an award N ranging from two to fifty credits;
- "–"—a consolation prize such as five credits;
- "+N games"—a number N of free spins of the slot reels in addition to the spins included in the purchased series of plays;
- "Power Play" (not shown)—at the conclusion of the purchased series of plays, an additional short series of three plays are awarded. During the additional short series, any accumulated elements in the various bonus games are kept intact except for the Held Bonus meter 74, which is reset to zero prior to the additional short series;
- "N Spaces →" (not shown)—further movement of the marker along the trail in the direction indicated by the arrow by the designated number N of spaces;

"×N Held Bonus"—changing the Held Bonus multiplier 76 to a number N such as ×2 or ×3;

"Hold Bonus Next Spin" (not shown)—appearance of the Held Bonus symbol 72 above the reels in FIG. 3 before the next reel spin;

"Streak Bonus +N"—advancement up the winning streak ladder 70 by a Winning Streak adder N;

"Plant Doubler"—enhancement (e.g., doubling) of the PLANT symbol 77 to indicate that any future winning combination along the same pay line as the PLANT symbol 77 will be enhanced;

Farmer Head—addition of a farmer head to the meter 82; and

Anti-gopher—addition of an anti-gopher 90 to the anti-gopher indicator 88.

At the conclusion of the purchased series of plays of the game, the machine may provide the player with an option to purchase an additional short series of three plays (e.g., "Power Play") for a predetermined number of credits such as 50 credits. During the Power Play, any accumulated elements in the various bonus games are kept intact except for the Held Bonus meter 74, which is preferably reset to zero prior to the Power Play. The purchase of the Power Play provides a player with an opportunity to accumulate additional elements in those bonus games that are close to completion. As noted above, a Power Play may also be triggered by the "Trail Bonus" game so that the player need not purchase the Power Play.

Referring to FIG. 3, the gaming machine includes a credit meter 94. When a player inserts money into the machine, a corresponding number of credits are added to the credit meter 94. Any wagers and Power Play purchases are deducted from the credit meter 94, and any credit amounts for winning outcomes are added to the credit meter 94. At the conclusion of a purchased series of plays and any Power Play, the player may collect any credits remaining on the credit meter 94 by pressing a "Collect" key 68. Alternatively, the player may place a wager to purchase a new series of plays. Prior to initiating the new series of plays, all of the bonus games are reset to include no accumulated elements.

The basic and bonus games may be implemented with games other than those in above-described embodiment. For example, the Monopoly™ poker game in FIGS. 12, 13, and 14 includes a basic video poker game (e.g., Jacks or Better draw poker) and an accumulation-type bonus game played on a Monopoly board. FIG. 12 is a video image on the primary display 12 associated with the basic video poker game. FIG. 13 is a video image on the primary display 12 associated with a house selection portion of a start stage of the Monopoly poker game. FIG. 14 is a video image on the secondary display 13 associated with the accumulation-type bonus game.

At a start stage of the Monopoly poker game, several events occur. First, instead of purchasing single plays of a video poker game as in conventional video poker, a player purchases a series of plays (e.g., deals) in advance. Referring to FIG. 12, the player may select his or her wager for the series of plays of the game by pressing a "Bet Per Series" key 100 on the primary display 12. The maximum wager for a series may, for example, be 50 credits. Any onscreen keys may be duplicated on a physical button panel so that the player may implement a function via either the touch screen or the button panel. Second, after the player enters his/her wager, the player presses a "Start Game" key 102 to cause the primary display 12 to transition to a house selection image shown in FIG. 13. The player is given the option to purchase houses to place on whatever property or properties the player selects on the depicted Monopoly board. The player may, for example, place all of the houses on a single property or on different properties. The distribution of houses on the properties is determined solely by the player. A maximum of four houses and a hotel may be placed on any one property, and the cost of each house varies with the property on which it is placed. To allow the player to easily select houses and properties for placement of the selected houses, the player is prompted to touch the property (e.g., deed) and then a "build houses" key 104 to build another house. The player may change his/her selections by pressing a "Clear Property" key 106 and/or a "Clear All Houses" key 108. After the player is done building houses, the player returns to the poker portion of the Monopoly poker game by pressing a "Return to Game" key 110.

After the start stage, the purchased series of ten plays of the Monopoly poker game commences. Instead of directly awarding credit amounts based on the ranking of a poker hand achieved in the basic video poker game as in conventional video poker, the pay table awards a combination of moves around the Monopoly board and credits for better hands. A possible pay table at a maximum wager is shown below:

| HAND | AWARD |
|---|---|
| Jacks or Better | 1 Move |
| Two Pair | 1 Move |
| Three of a Kind | 2 Moves |
| Straight | 2 Moves |
| Flush | 3 Moves |
| Full House | 4 Moves |
| Four of a Kind | 5 Moves + 25 Credits |
| Straight Flush | 10 Moves + 50 Credits |
| Royal Flush | 20 Moves + 1000 Credits |

Referring back to FIG. 12, in each play of the purchased series of plays, the player initially plays Jacks or Better draw poker. In each play of draw poker, the CPU randomly selects five playing cards 112, 114, 116, 118, and 120 from a standard deck of 52 cards and displays the cards on the primary display 12. The player may then discard up to all five displayed cards (e.g., by touching the cards to discard or to hold) and replace the discarded cards with respective cards randomly selected by the CPU from the remaining 47 cards in the deck. For each play of draw poker in which the player achieves a poker hand on the pay table, the player is awarded the award in the pay table for the winning poker hand.

Referring to FIG. 14, each awarded "move" involves rolling a pair of dice 122 shown on the secondary display 13. The player's token 124 advances around the Monopoly board by a number of spaces corresponding to a sum of the numbers shown on the rolled dice 122. If the rolled dice 122 show matching numbers (e.g., a "double"), the player is awarded a free roll of the dice 122. The player's token 124 is initially located on the "Go" space at the start of a purchased series of plays, so the first move for the first winning poker hand in the series of plays commences from the "Go" space. Subsequent moves, however, commence from whatever space on which the player's token landed as a result of the previous move.

The spaces on the Monopoly board have different events associated therewith. The event for a space is triggered if the player's token 124 lands on that space. First, each property on the Monopoly board awards an associated credit amount. The credit amount is higher for each house that the player has placed on the property. An example of a pay table for a particular property is shown below:

| Vermont Avenue | |
|---|---|
| HOUSES | CREDITS |
| Rent | 1 |
| 1 House | 10 |
| 2 Houses | 20 |
| 3 Houses | 30 |
| 4 Houses | 40 |
| Hotel | 50 |

Second, Water Works and Electric Company preferably trigger associated mini-bonus features. The mini-bonus feature may, for example, includes an animation to illustrate the CPU's random or pseudo-random selection of a credit amount from a plurality of possible credit amounts. The animation is disclosed in detail in U.S. Pat. No. 6,315,660 to DeMar et al., which is incorporated herein by reference in its entirety. Third, Income Tax, Go to Jail, Just Visiting, or Luxury Tax award respective credit amounts to the player. The awarded credit amount is shown in the middle of the Monopoly board. Fourth, Free Parking awards the player a total amount of credits accumulated throughout the purchased series of plays.

Fifth, Chance and Community Chest preferably trigger associated mini-bonus features. The Chance mini-bonus feature may, for example, present the player with a series of selectable generic property cards. The player is prompted to successively select the cards (e.g., by touching the cards) until an end-bonus symbol (i.e., stopper) is revealed. For each selected card that reveals a property on the Monopoly board, a house is placed on that property in addition to any houses that are already on that property. The Community Chest mini-bonus feature may be similar as the Chance mini-bonus feature except that the player receives free additional plays of the basic draw poker game instead of additional houses. Therefore, as the player's token 124 moves around the Monopoly board, the player may accumulate additional houses and additional plays of the basic draw poker game to add to the excitement of the game.

The Monopoly poker game is generally a combination of a basic video poker game and an accumulation-type Monopoly bonus game, so the card playing strategy in a standard Jacks or Better video poker game may be somewhat affected by the return implications of each specific winning poker hand. For example, on the one hand, according to the above-illustrated pay table a Straight in the Monopoly poker game yields an award (e.g., 2 Moves) that is twice the award (e.g., 1 Move) yielded by a pair of Jacks or Better. On the other hand, in a standard Jacks or Better video poker game that is not combined with any bonus games, a Straight yields an award that is four times the awarded yielded by a pair of Jacks or Better. To ensure that the Monopoly poker game is played at a fairly rapid pace, it is not desirable to yield an award of 4 Moves for a Straight.

Because the award for a Straight in the Monopoly poker game is only 2 Moves, the card playing strategy in the Monopoly poker game is different from the card playing strategy in a standard Jacks or Better video poker game. The different card playing strategy may be shown by way of example. Suppose a player is initially dealt a poker hand including J♥, 10♦, 9♣, 8♦, and 2♠. On the one hand, in a standard Jacks or Better video poker game the player would hold J♥, 10♦, 9♣, and 8♦ and discard the 2♠ in an attempt to achieve a Straight. On the other hand, in the Monopoly poker game the player would hold only the J♥ and discard the remaining cards in an attempt to obtain a pair of Jacks or Better. Other differences between the pay table for the Monopoly poker game and the pay table for a standard Jacks or Better video poker game similarly yield differences in card playing strategy.

In an alternative embodiment of the Monopoly poker game, the player may select the number of plays in the purchased series and therefore determine the length of the gaming experience. The player may, for example, purchase the number of plays in a series in increments of ten varying from a minimum of 10 plays to a maximum of 50 plays. The cost of each house, if the player elected to purchase any during the start stage, would vary in this alternative math model. The button panel layout on the gaming machine in this alternative embodiment may appear as below:

| 10 PLAYS | 20 PLAYS | 30 PLAYS | 40 PLAYS | 50 PLAYS |
|---|---|---|---|---|
| BET 1 -HOLD- | BET 2 -HOLD- | BET 3 -HOLD- | BET 4 -HOLD- | BET 5 -HOLD- |

In alternative embodiments, the houses in the house selection stage are distributed in different ways. In a first alternative, the player is given a number N of free houses to place on the Monopoly board. In a second alternative, the player is given a number N of free houses to place on the Monopoly board and has the option of purchasing of additional houses. In a third alternative, the player is given a random number N of free houses and the game, not the player, randomly places the houses on the Monopoly board.

It can be seen that the above-described gaming machine can provide an entertaining and dynamic gaming experience. Unlike conventional gaming machines that provide a player with a single play of a game for a single wager, the gaming machine of the present invention provides a player with a series of plays for a single wager. This, in turn, allows the gaming machine of the present invention to offer a variety of frequently occurring, dynamic features that cannot practically be offered by conventional gaming machines. These dynamic features may, for example, include bonus games of the above-described accumulation type that accumulate one or more elements over a plurality of the plays in the purchased series. Because the accumulation-type bonus games are reset prior to each purchased series of plays, the gaming machine would not experience the above-noted problems (e.g., "vulturing" bystanders and frustrated players that run out of money before redeeming an accumulated element) associated with conventional gaming machines that have attempted to introduce accumulation-type bonus games.

The payback percentage of a gaming machine may be defined as the portion of each credit wagered that is returned to players via winning payouts over the long term. The payback percentage is typically set somewhere between about 85 percent and about 98 percent, depending upon the monetary value of each credit. On the one hand, to achieve the desired payback percentage in conventional gaming machines, the hit frequency for any bonus games (especially of the non-accumulating type) is generally kept quite low (e.g., once every 50 to 100 plays) to maintain an acceptable level of volatility. This low hit frequency creates a static gaming experience that can lead to boredom and frustration.

On the other hand, to achieve the desired payback percentage in the gaming machine of the present invention, the hit frequency for any bonus games (especially of the accumulating type) may be quite high. One or more of the bonus games may accumulate an element almost every play, especially in the first embodiment, and one or more of the bonus games may provide some type of award during almost every purchased series of plays. The wager from a player to purchase a series of plays will generally be much larger than a single play wager on conventional machines because the player should perceive the series of plays as having greater value than a single play. With this larger wager, any bonus games may be triggered quite frequently while maintaining the desired payback percentage and an acceptable level of volatility. In fact, the basic game may become secondary in emphasis to the various bonus games.

While the present invention has been described with reference to one or more particular embodiments, those skilled in the art will recognize that many changes may be made thereto without departing from the spirit and scope of the present invention. For example, the pay table of the Monopoly poker game directly provides non-credit-based awards for different poker hand rankings. The non-credit-based awards include a number of movements along a trail created by the Monopoly board. Other non-credit-based awards are possible, however, such as a number of free plays of the game, a number of selections in a bonus selection game, or a number of collected elements. The collected elements may trigger credit-based awards as more elements are collected. Each of these embodiments and obvious variations thereof is contemplated as falling within the spirit and scope of the claimed invention, which is set forth in the following claims:

What is claimed is:

1. A method of conducting a wagering game on a gaming machine, the method comprising:

receiving, via an input device, a single wager from a player to purchase a series of plays of a basic portion of the game, the series of plays comprising a fixed number of plays of the wagering game, the single wager being allocated to the entire series of plays and not being associated with any specific one of the series of plays, the single wager being an amount made by any player such that different players pay the same amount;

in response to the single wager, providing, on at least one display device, the player with the series of plays of the basic portion of the wagering game, the wagering game including a plurality of outcomes, the plurality of outcomes including a plurality of winning outcomes corresponding to first awards to be awarded to the player, the plurality of winning outcomes including different winning outcomes having corresponding different ones of the first awards;

randomly selecting, by use of at least one processor, at least one outcome from the plurality of outcomes for each play in the series of plays of the basic portion of the wagering game;

in response to the randomly selected outcome being one of the plurality of different winning outcomes in any one of the plays, providing the player with the first award corresponding to the randomly selected outcome; and providing an accumulation feature that accumulates a game-play element of the game over a plurality of the plays in the series of plays of the basic portion of the wagering game, the accumulated game-play element providing a second award to the player in response to a predetermined criterion being met, the accumulation feature is reset to include no accumulated game-play elements prior to each purchased series of plays.

2. The method of claim 1, wherein the basic portion is selected from a group consisting of slots, poker, keno, bingo, blackjack, and roulette.

3. The method of claim 2, wherein the accumulation feature is triggered by a special outcome in the basic portion.

4. The method of claim 1, wherein the accumulated element is represented on the at least one display device by a position on a trail, ladder, or meter.

5. The method of claim 4, wherein the position identifies a credit amount, a multiplier, a number of free plays of the basic portion, a bonus round, or movement to another position on the trail, the ladder, or the meter.

6. The method of claim 1, wherein the accumulated game-play element is a collected object.

7. The method of claim 6, further including triggering a bonus in response to collection of a predetermined number of the object during the series of plays.

8. The method of claim 1, wherein each play includes at least one respective random event that is independent of other plays in the series.

9. The method of claim 8, wherein the game includes the basic portion and a bonus feature triggered by a special outcome in the basic portion, the at least one random event being associated with the basic portion.

10. The method of claim 1, wherein each play includes at least one random event that is interdependent of one or more other plays in the series.

11. The method of claim 10, wherein the wagering game includes the basic portion and a bonus feature triggered by a special outcome in the basic portion, the at least one random event being associated with the bonus feature.

12. The method of claim 1, further including redeeming, prior to the completion of the series of plays, the accumulated game-play element for the second award in response to the predetermined criterion in the series of plays being met, and after the bonus is complete, returning to the series of plays of the basic portion of the wagering game until completion.

13. The method of claim 12, wherein the predetermined criterion corresponds to collection of a predetermined number of the accumulated game-play element.

14. The method of claim 12, wherein the predetermined criterion corresponds to a certain position of the element on a trail, ladder, or meter on the at least one display device.

15. The method of claim 1, wherein the basic portion includes a slot game having a plurality of symbol-bearing reels that, during each play in the series, are spun and stopped to place symbols on the reels in visual association with a display area on the at least one display device.

16. The method of claim 1, wherein the basic portion includes a draw poker game having a plurality of playing cards that, during each play in the series, are dealt from a deck and selectively replaced with substitute cards from the deck.

17. The method of claim 1, further including redeeming the accumulated game-play element for a bonus event in response to a predetermined criterion before completing the series of plays;

playing the bonus event; and continuing the series of plays.

18. The method of claim 17, wherein the predetermined criterion corresponds to collection of a predetermined number of the accumulated element.

19. The method of claim 1, wherein the accumulated game-play element is a number of consecutive winning symbol combinations achieved in the basic game, the second award being a credit amount corresponding to the number of consecutive winning symbol combinations.

20. The method of claim 1, wherein the accumulated game-play element is a total value of credits being awarded as the first awards to the player for outcomes achieved in the basic game when a randomly appearing hold-bonus symbol is present during the outcomes that resulted in the first awards in the basic game, the second award being a credit amount related to the total value of credits achieved when the randomly appearing hold-bonus symbol is present during the series of plays.

21. The method of claim 1, wherein the accumulated game-play element is a number of occurrences of a certain winning symbol combination achieved in the basic game, the second award being an enhancement of a credit amount corresponding to the certain winning symbol combination, the enhancement corresponding to the number of the certain winning symbol combination that has previously occurred during the series of plays.

22. A method of conducting a wagering game on a gaming machine, the method comprising:

receiving, via an input device, a single wager from a player to purchase a series of plays of a basic portion of the game, the series of plays comprising a fixed number of plays of the wagering game, the single wager being allocated to the entire series of plays and not being associated with any specific one of the series of plays;

in response to the single wager, providing, on at least one display device, the player with the series of plays of the basic portion of the wagering game;

randomly generating, by use of at least one processor, at least one outcome of each play in the series of plays of the basic portion of the wagering game, the outcomes being indicated by symbol combinations developed from a plurality of individual symbols on the at least one display device;

awarding a first basic-game award to the player for a first winning outcome indicated by a winning symbol combination in any one of the series of plays;

awarding a second basic-game award to the player for a second winning outcome indicated by a winning symbol combination in another one of the series of plays, the second basic-game award being different from the first basic-game award;

accumulating a game-play element in an accumulation feature during the plurality of the plays in the series of plays of the basic portion of the wagering game, the accumulated game-play element being associated with the symbol combinations that are displayed on the at least one display device during the series of plays of the basic portion of the wagering game, the accumulated game-play element not being associated with a credit value corresponding to winning symbol combinations achieved by the player;

awarding an accumulation-feature award to the player for the accumulation feature in response to a predetermined criterion being met for the accumulated game-play element; and resetting the accumulation feature to include no accumulated game-play elements prior to the next purchased series of plays.

23. The method of claim 22, wherein the awarding of the accumulation-feature award occurs in a separate bonus game that is displayed on the at least one display device to the player.

24. The method of claim 22, wherein the accumulation feature includes a second game-play element that can be accumulated and further including, accumulating the second game-play element during the series of plays of the basic portion of the wagering game, and awarding another award to the player in response to another predetermined criterion being met for the second accumulated game-play element.

25. A method of conducting a wagering game on a gaming machine, the method comprising:

receiving, via an input device, a single wager from a player to purchase a series of plays of a basic portion of the game, the series of plays comprising a fixed number of plays of the wagering game, the single wager being allocated to the entire series of plays and not being associated with any specific one of the series of plays, the single wager being an amount made by any player such that different players pay the same amount;

in response to the single wager, providing, on at least one display device, the player with the series of plays of the basic portion of the wagering game, the wagering game including a plurality of outcomes, the plurality of outcomes including a plurality of winning outcomes corresponding to first awards to be awarded to the player, the plurality of winning outcomes including different winning outcomes having corresponding different ones of the first awards;

randomly generating, by use of at least one processor, at least one outcome of each play in the series of plays of the basic portion of the wagering game, the outcomes being indicated by symbol combinations developed from a plurality of individual symbols on the at least one display device;

accumulating an element in an accumulation feature during the plurality of the plays in the series of plays of the basic portion of the wagering game, the accumulated game-play element involving the symbol combinations that are displayed on the at least one display device during the series of plays of the basic portion of the wagering game, the accumulated game-play element not being related to the credit amount associated with the winning symbol combinations achieved by the player;

before completing the series of plays of the basic portion of wagering game, permitting the player to play a bonus game in response to a predetermined criterion being met for the accumulated element;

after completion of the bonus game, returning to the basic portion of the game to continue playing the series of plays associated with the single wager until the fixed number of plays have been completed; and resetting the accumulation feature to include no accumulated game-play elements prior to the next purchased series of plays.

26. The method of claim 25, further including awarding first awards for winning outcomes in the basic portion of the game and awarding an additional bonus award associated with the bonus game.

* * * * *